US007363634B2

(12) United States Patent
Lin

(10) Patent No.: US 7,363,634 B2
(45) Date of Patent: Apr. 22, 2008

(54) STORAGE DEVICE ASSEMBLY INCORPORATING EJECTING MECHANISM WITH SAFETY LATCH

(75) Inventor: Ju Shan Lin, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 374 days.

(21) Appl. No.: 10/832,959

(22) Filed: Apr. 26, 2004

(65) Prior Publication Data
US 2004/0213141 A1  Oct. 28, 2004

(30) Foreign Application Priority Data
Apr. 25, 2003  (TW)  ............................... 92206591 U

(51) Int. Cl.
*G11B 7/00* (2006.01)
(52) U.S. Cl. ...................................... 720/610; 720/609
(58) Field of Classification Search ................ 720/610, 720/647, 657, 600, 601, 637, 639; 369/292, 369/30.93, 30.96, 30.97, 30.99; 360/99.06, 360/99.3, 96.3, 99.02
See application file for complete search history.

(56) References Cited

U.S. PATENT DOCUMENTS

| 3,357,682 A | * | 12/1967 | Martens et al. ............. 366/344 |
| 5,307,238 A | * | 4/1994 | Marcus ....................... 361/681 |
| 5,340,340 A | * | 8/1994 | Hastings et al. .............. 439/64 |
| 5,497,296 A | * | 3/1996 | Satou et al. ................. 361/681 |
| 5,504,729 A | * | 4/1996 | Ikedo et al. ................. 720/614 |
| 5,754,908 A | * | 5/1998 | Okutsu et al. .............. 396/517 |
| 5,831,956 A | * | 11/1998 | Sawai et al. ................. 720/600 |
| 5,903,538 A | * | 5/1999 | Fujita et al. .............. 369/30.76 |
| 6,044,058 A | * | 3/2000 | Miyazaki et al. ........... 720/720 |
| 6,111,838 A | * | 8/2000 | Akiba ......................... 720/610 |
| 6,137,760 A | * | 10/2000 | Okamoto .................... 720/647 |
| 6,266,312 B1 | * | 7/2001 | Akiba ......................... 720/610 |
| 6,419,084 B1 | * | 7/2002 | Sandor .................... 206/308.1 |
| 6,460,693 B1 | * | 10/2002 | Harrold ....................... 206/1.5 |
| 6,848,112 B2 | * | 1/2005 | Bae et al. ................... 720/600 |

FOREIGN PATENT DOCUMENTS

| JP | 63231762 A | * | 9/1988 |
| JP | 08138300 A | * | 5/1996 |

* cited by examiner

*Primary Examiner*—Brian E Miller
*Assistant Examiner*—Matthew G. Kayrish
(74) *Attorney, Agent, or Firm*—Wei Te Chung

(57) ABSTRACT

A storage device assembly includes a storage device (40), a cover (30), a button (10) and a bracket (20). The storage device includes a tray (44). The cover defines a button slot (34) and a pair of apertures (38) therein. The bracket is removably attached to the cover, and includes a pair of resilient legs (25). A pair of latches (26) is formed on the legs of the bracket respectively. The button is received in the button slot of the cover. The button is slidable relative to the bracket between an open position and a closed position. In the closed position, the button deforms the legs in opposite directions and drives the latches to protrude out beyond the apertures respectively, thereby locking the tray. In the open position, the legs rebound and the latches are withdrawn from the apertures respectively, and the tray can be ejected.

15 Claims, 6 Drawing Sheets

STORAGE DEVICE ASSEMBLY INCORPORATING EJECTING MECHANISM WITH SAFETY LATCH

BACKGROUND OF THE INVENTION

1. Field of the Invention

The present invention relates to storage device assemblies, and more particularly to a storage device assembly incorporating an ejecting mechanism with a safety latch.

2. Description of the Related Art

Storage devices such as optical disc drives are widely available as standard peripheral devices for electronic apparatuses such as computers. The computer often needs to read or write data from or to the storage device. The storage device typically comprises a casing, and a tray ejectably received in the casing. When the storage device is an optical disc drive, the tray is for fixing an optical disc thereon. A button is provided on the front of the tray or the casing under the tray. When the button is pushed inwardly, the tray is ejected from the casing. However, the tray is liable to be inadvertently ejected due to touching of the button by accident. If this occurs while the computer is exchanging data with the storage device, both the storage device and the computer may sustain serious damage.

SUMMARY OF THE INVENTION

Accordingly, an object of the present invention is to provide a storage device assembly which prevents accidental ejecting of a tray thereof.

To achieve the above object, a storage device assembly in accordance with the present invention comprises a storage device, a cover, a button and a bracket. The storage device comprises a casing, and a tray ejectably received in the casing. The cover is attached to the tray, and comprises a front wall, and an upper wall and a lower wall extending rearward from the front wall. A button slot is defined in the front wall. A pair of apertures is defined in the upper and lower walls of the cover respectively. The bracket is removably attached to the cover, the bracket comprising a base and a pair of resilient legs extending from the base. A pair of latches is formed on free ends of the legs of the bracket respectively. The button is received in the button slot of the cover. The button is slidable relative to the bracket between an open position and a closed position. In the closed position, the button deforms the legs of the bracket in opposite directions, and drives the latches to protrude out beyond the apertures of the cover respectively, thereby locking the tray. When the button is slide from the closed position to the open position, the legs rebound to their original positions, accordingly, the latches of the bracket are withdrawn from the apertures of the cover, and the tray can be ejected.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
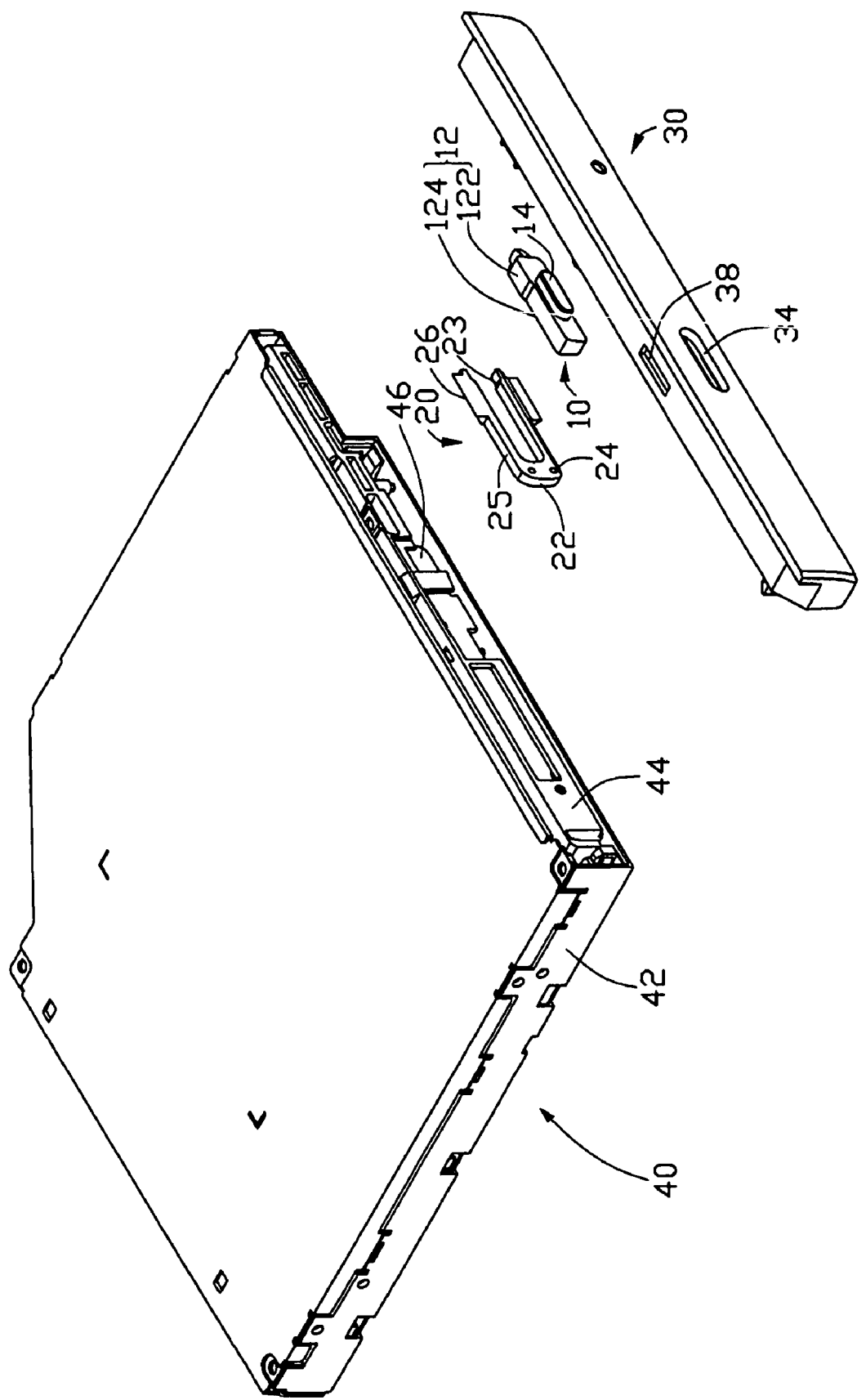
FIG. 1 is an exploded, isometric view of a storage device assembly in accordance with a preferred embodiment of the present invention, the storage device assembly comprising a storage device, a cover, a bracket, and a button.
Figure 2:
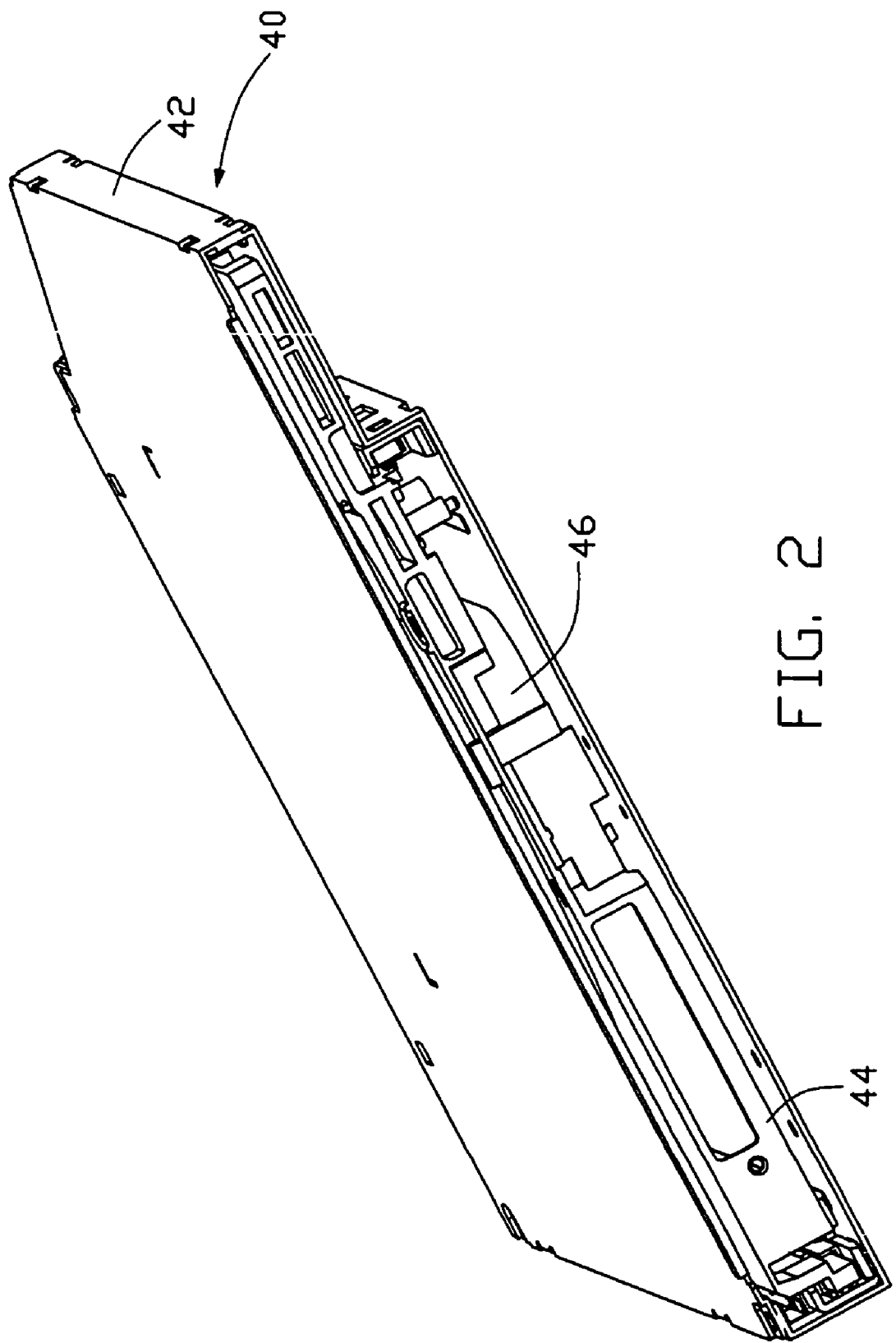
FIG. 2 is an enlarged view of the storage device of FIG. 1, but viewed from another aspect.
Figure 3:
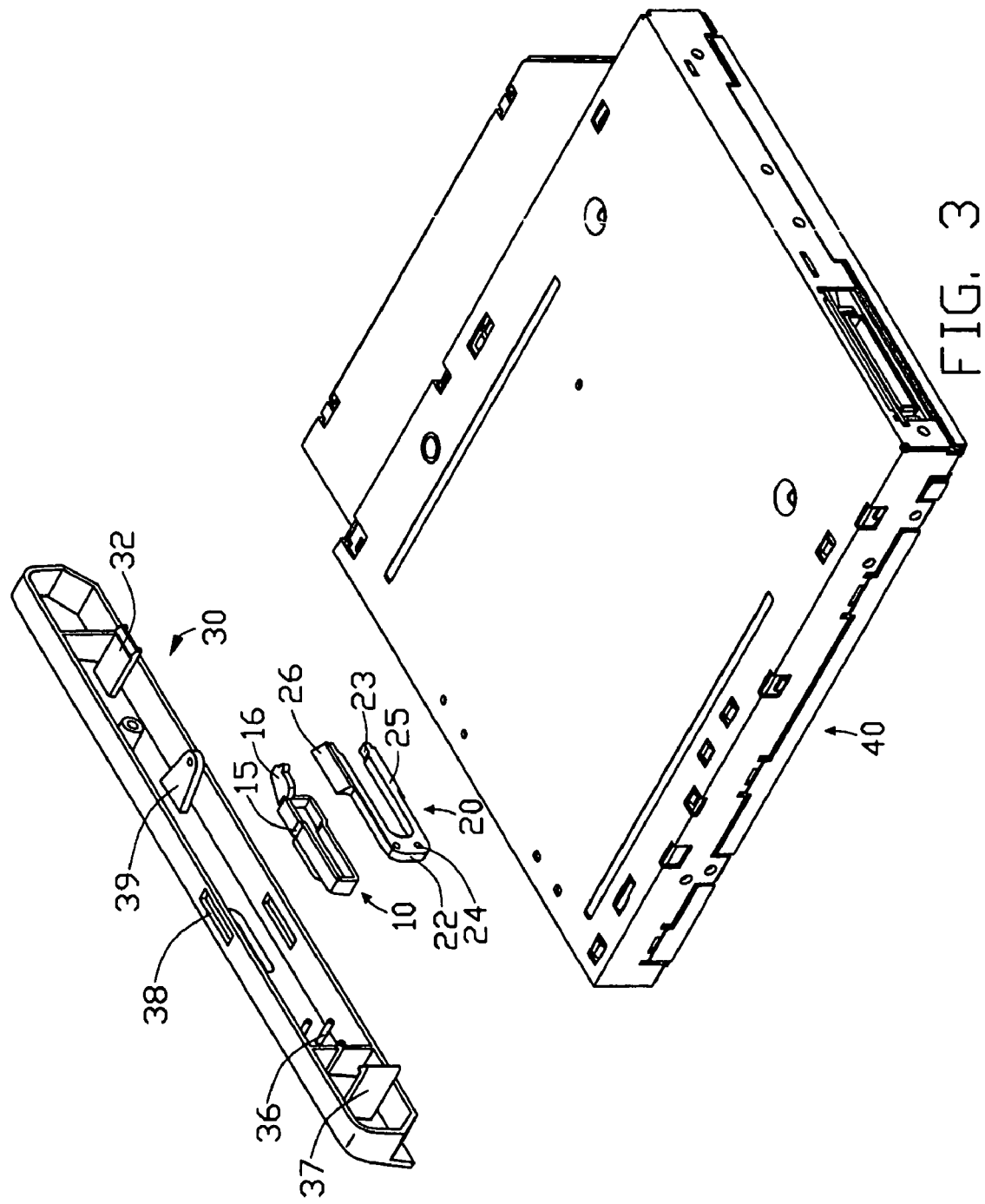
FIG. 3 is similar to FIG. 1, but viewed from another aspect and showing all the components inverted.

Referring to FIGS. 1 to 3, a storage device assembly in accordance with the preferred embodiment of the present invention comprises a storage device 40, a cover 30, a button 10 and a bracket 20.

The storage device 40 comprises a casing 42, and a tray 44 ejectably received in the casing 42. The tray 44 is for holding a data disc thereon. A controlling member 46 is mounted on the tray 44. The controlling member 46 is an integral part of an ejecting mechanism, and the tray 44 is ejected out from the casing 42 when the controlling member 46 is pushed inwardly.

The cover 30 is generally parallelepiped-shaped. A button slot 34 is defined in a front wall of the cover 30. An upper wall and a lower wall extend rearward from the front wall of the cover 30. A pair of apertures 38 is defined in the upper and lower walls respectively. The apertures 38 are opposite each other, and adjacent the button slot 34. A pair of vertically spaced pins 36 extends inwardly from the front wall of the cover 30, between the button slot 34 and an end of the front wall nearest the button slot 34. A pair of catches 32, 37 is inwardly formed from the front wall at opposite ends of the cover 30 respectively. The catches 32, 37 are oriented perpendicular to each other, with the catch 37 being nearest the pins 36. A tab 39 is inwardly formed from the front wall between the button slot 34 and the catch 32. The cover 30 is attached to the storage device 40, with the catches 32, 37 and the tab 39 engaging with the tray 44.

The bracket 20 is generally U-shaped. The bracket 20 comprises a base 22, and a pair of parallel, resilient legs 25 extending from the base 22. A pair of holes 24 is defined in the base 22, for receiving the pins 36 of the cover 30. A pair of slanted portions 23 is formed on insides of free ends of the legs 25 respectively. A pair of symmetrically opposite, wedge-shaped latches 26 is formed on outsides of the free ends of the legs 25 respectively, corresponding to the apertures 38 of the cover 30.

The button 10 comprises a main body 12, and an operating member 14 formed on a front of the main body 12. The main body 12 comprises a thick portion 122, a thin portion 124, and a pair of symmetrically opposite inclined portions 15 connecting between the thick portion 122 and the thin portion 124. A contact 16 is formed on a distal end of the thick portion 122, for engaging with the controlling member 46 of the storage device 40 in order to eject the tray 44.

In assembly of the storage device assembly, the button 10 is firstly received between the legs 25 of the bracket 20, with the inclined portions 15 of the button 10 abutting the slanted portions 23 of the bracket 20. Then, the combined button 10 and bracket 20 is attached to the cover 30. The bracket 20 is received between the upper and lower walls of the cover 30, with the pins 36 of the cover 30 being engagingly received through the holes 24 of the bracket 20. The operating member 14 of the button 10 is received in the button slot 34 of the cover 30. In this position, the latches 26 of the bracket 20 are in alignment with the apertures 38 of the cover 30 respectively. Finally, the cover 30 is fixed to the tray 44 of the storage device 40, by engagement of the catches 32, 37 and the tab 39 with the tray 44.

Figure 4:
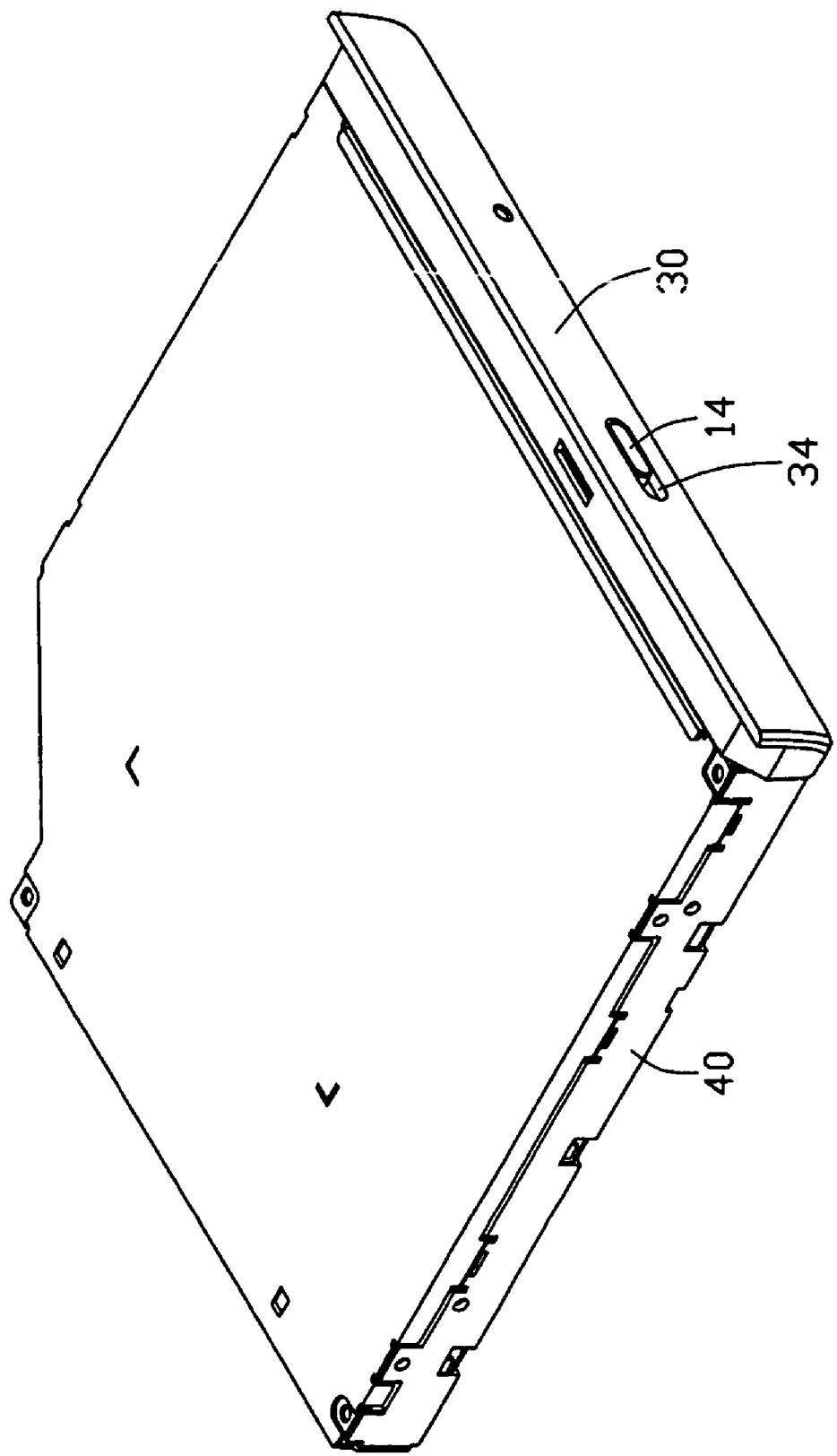
FIG. 4 is an assembled view of FIG. 1, showing the button in an open position.
Figure 5:
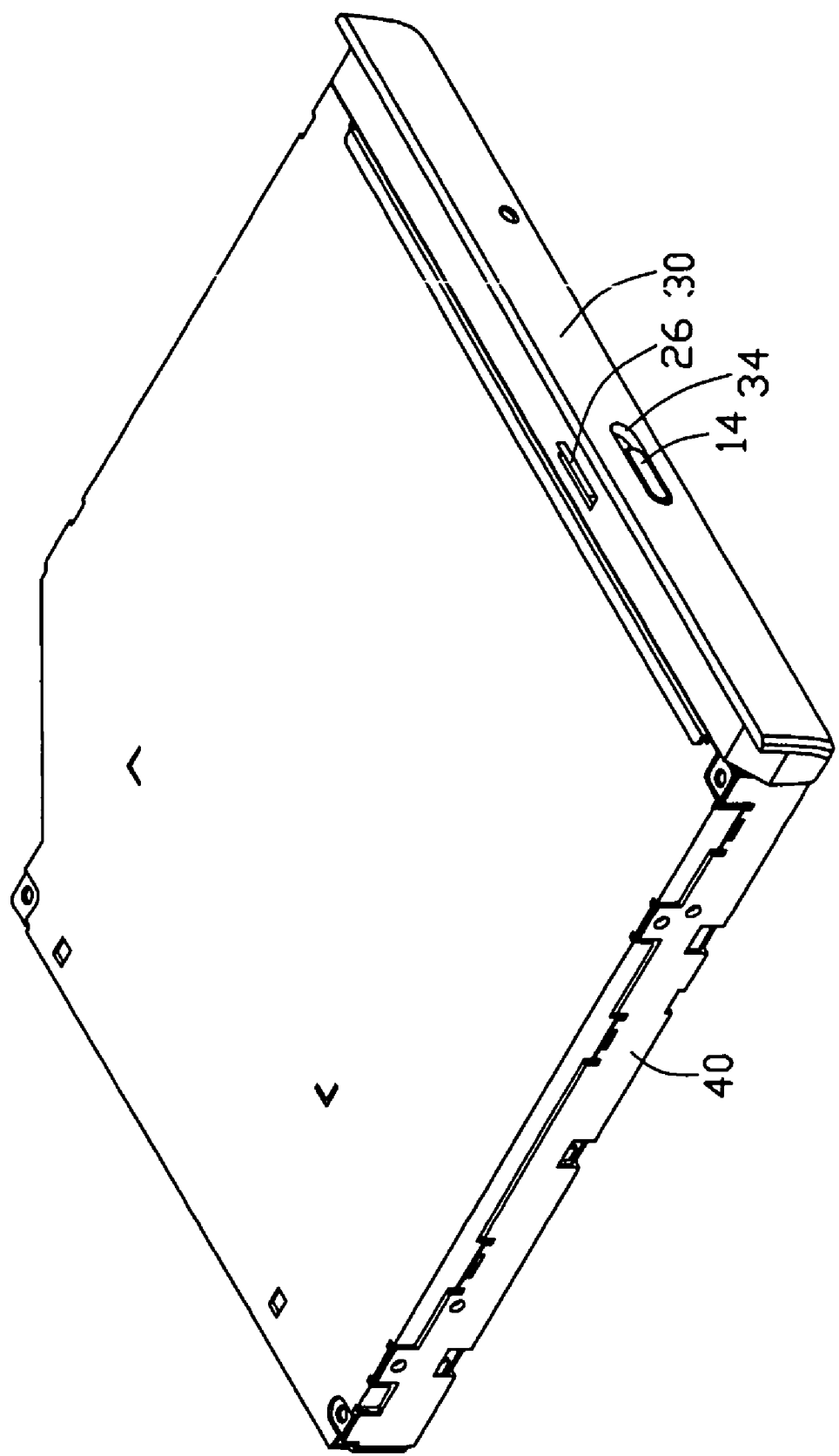
FIG. 5 is similar to FIG. 4, but showing the button in a closed position.
Figure 6:
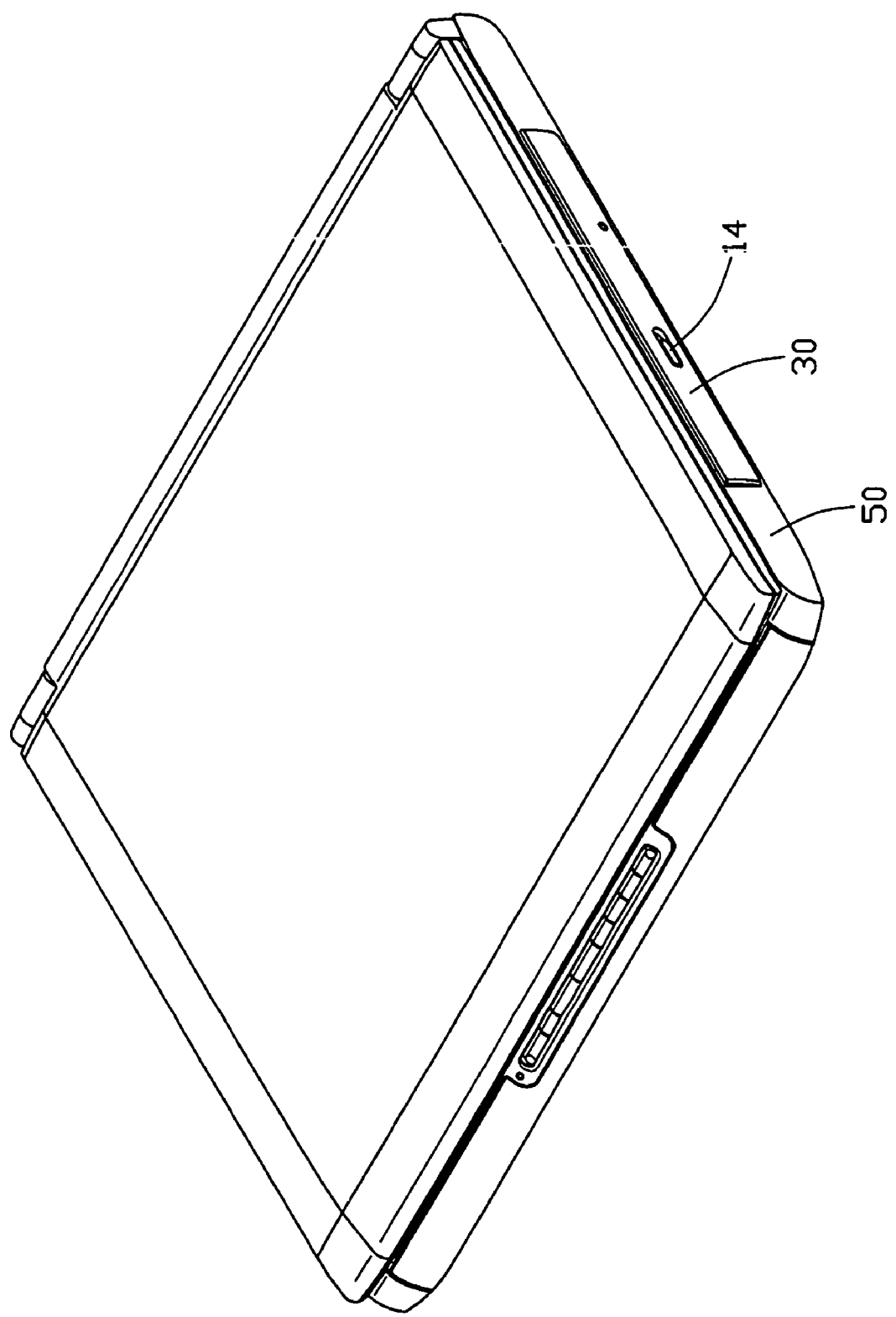
FIG. 6 is an isometric view of a computer having the storage device assembly of FIG. 5 mounted therein.

In use, the storage device assembly is fixed in an electronic apparatus such as a computer 50. A pair of fixing members is provided in the computer 50, corresponding to the latches 26. For example, the fixing members may comprise holes. The operating member 14 of the button 10 is slidable in the button slot 34 of the cover 30 between an open position (see FIG. 4) and a closed position (see FIG. 5). When the button 10 is slid to the closed position by pushing the operating member 14 along the button slot 34 of the cover 30, the thick portion 15 of the button 10 is slid toward the base 22 of the bracket 20 along the slanted portions 23, and enters between the legs 25 of the bracket 20. The legs 25 are elastically deformed in opposite directions, and drive the latches 26 of the bracket 20 to protrude out beyond the apertures 38 of the cover 30 and engage with the fixing members of the computer 50. Accordingly, the tray 44 of the storage device assembly is blocked by the fixing members, and cannot be ejected.

To eject the tray 44 from the storage device 40, the button 10 is slid from the closed position to the open position. The thick portion 122 of the button 10 exits from between the legs 25, and the legs 25 rebound to their original positions. The latches 26 of the bracket 20 are thus disengaged from the fixing members of the computer 50, and withdrawn back through the apertures 38 of the cover 30. When the button 10 reaches the open position, the contact 16 thereof contacts the controlling member 46 of the storage device 40, and the tray 44 is ejected.

In an alternative embodiment of the storage device assembly of the present invention, only one latch 26 is provided on the bracket 20. In a further alternative embodiment, only one leg 25 is provided on the bracket 20, the leg 25 having one latch 26 thereon. In a still further alternative embodiment, the bracket 20 is integrally formed with the cover 30. In each and in any combination of these alternative embodiments, other associated parts of the storage device assembly are configured accordingly.

While the present invention has been illustrated by the description of the preferred embodiments thereof, and while the preferred embodiments have been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A storage device assembly comprising:
a storage device comprising a casing, and a tray ejectably received in the casing;
a cover attached to the tray, the cover defining a button slot and at least one aperture therein;
a bracket attached to the cover, the bracket comprising a base and at least one resilient leg extending from the base, at least one latch corresponding to said aperture of the cover formed on the at least one resilient leg;
a button slidably received in the button slot of the cover, the button being slidable relative to the bracket between a first position in which the button urges said latch of the bracket to engage in said aperture of the cover thereby locking the tray and a second position in which the button releases said latch from said aperture and actuates ejection of the tray, the button comprising:
a main body with a thick portion and a thin portion; and
a contact arranged on an end of the main body; and
a controlling member corresponding to the button; the controlling member being arranged such that, when the button is in the second position, the contact engages with the controlling member for ejecting the tray from the casing of the storage device.

2. The storage device assembly as claimed in claim 1, wherein said latch is arranged on an outside of said resilient leg of the bracket.

3. The storage device assembly as claimed in claim 1, wherein in the second position, the thin portion of the button mates with said resilient leg of the bracket, and when the button is slid from the second position to the first position, the thick portion of the button urges said resilient leg to urge said latch to protrude out beyond said aperture of the cover.

4. The storage device assembly as claimed in claim 1, wherein the cover comprises a front wall, and an upper wall and a lower wall extending from the front wall, the button slot is defined in the front wall, and said aperture is defined in at least one of the upper and lower walls.

5. The storage device assembly as claimed in claim 4, wherein a plurality of catches is arranged on the front wall of the cover, the catches engaging with the tray of the storage device.

6. A storage device assembly comprising:
a storage device adapted to be received in an electronic apparatus, the storage device comprising an ejectable tray;
a cover attached to the tray of the storage device, the cover defining a long button slot extending in a first direction, and at least one aperture;
a bracket arranged between the storage device and the cover, the bracket comprising at least one resilient leg, at least one latch being formed on said resilient leg in alignment with said aperture of the cover; and
a button slidably received in the button slot of the cover;
wherein the button slides along the button slot in the first direction, the button drives said latch of the bracket to move in a second direction perpendicular to the first direction, and said latch protrudes out beyond said aperture of the cover for engaging with the electronic apparatus.

7. The storage device assembly as claimed in claim 6, wherein the button comprises a main body, the main body comprises a thick portion and a thin portion, the button is slidable between an open position and a closed position, in the closed position the thick portion elastically deforms said resilient leg, and in the open position the thick portion disengages from said resilient leg.

8. The storage device assembly as claimed in claim 7, wherein an operating member is arranged on the main body and received in the button slot of the cover.

9. The storage device assembly as claimed in claim 7, wherein a controlling member is provided on the tray, and a contact is provided at a free end of the thick portion of the button corresponding to the controlling member.

10. The storage device assembly as claimed in claim 7, wherein at least one inclined portion is defined between the thick portion and the thin portion of the button, and at least one slanted portion is formed at an inside of a free end of said resilient leg of the bracket corresponding to said inclined portion of the button, said inclined portion and said slanted portion facilitating sliding of the thick portion of the button into the bracket.

11. The storage device assembly as claimed in claim 6, wherein the cover comprises a front wall and an upper wall and a lower wall extending from the front wall, the button slot is defined in the front wall, and said aperture is defined in at least one of the upper and lower walls.

12. The storage device assembly as claimed in claim 11, wherein the bracket further comprises a base, the base defines a plurality of holes, a plurality of pins is formed on the cover, and the pins are engagingly received in the holes of the base thereby attaching the bracket to the cover.

13. A storage device assembly comprising:
- a storage device comprising a casing and an ejectable tray moveable relative to the casing along a first direction;
- a button slidable relative to the storage device along a second direction between first and second positions;
- a controlling member actuated by said button; and
- a deflectable latch located on one of said casing and said tray, and said latch being discrete from the button while being actuated to function by said button; wherein the latch is locked to the other of the casing and the tray when said button is moved to the first position along a third direction perpendicular to the second direction so as to assure the tray will not be incautiously ejected from the casing; the latch is unlocked to the second position so as to allow the tray to be ejected from the casing under a condition that the controlling member is actuated by said button, and the controlling member thus triggers an ejection of the tray.

14. The storage device assembly as claimed in claim 13, wherein said both said button and said latch are moved together with the tray.

15. The storage device assembly as claimed in claim 14, wherein the second direction is perpendicular to said first direction.

* * * * *